(12) United States Patent
Beisel et al.

(10) Patent No.: US 12,083,467 B2
(45) Date of Patent: Sep. 10, 2024

(54) FOLDABLE FILTER ARRANGEMENT CONSISTING OF A PLURALITY OF INDIVIDUAL FILTER ELEMENTS

(71) Applicant: Carl Freudenberg KG, Weinheim (DE)

(72) Inventors: Tobias Beisel, Moerlenbach (DE); Alexander Oelsner, Mannheim (DE); Christoph Krambs, Heidelberg (DE); Peter Zimmermann, Abtsteinach (DE); Emre Karasu, Weinheim (DE); Peter Capuani, Waldmichelbach (DE)

(73) Assignee: CARL FREUDENBERG KG, Weinheim (DE)

( * ) Notice: Subject to any disclaimer, the term of this patent is extended or adjusted under 35 U.S.C. 154(b) by 405 days.

(21) Appl. No.: 17/546,078

(22) Filed: Dec. 9, 2021

(65) Prior Publication Data

US 2022/0176296 A1  Jun. 9, 2022

(30) Foreign Application Priority Data

Dec. 9, 2020 (EP) ..................................... 20212692

(51) Int. Cl.
*B01D 46/12* (2022.01)
*B01D 46/00* (2022.01)
(Continued)

(52) U.S. Cl.
CPC ......... *B01D 46/12* (2013.01); *B01D 46/0008* (2013.01); *B01D 46/0016* (2013.01);
(Continued)

(58) Field of Classification Search
None
See application file for complete search history.

(56) References Cited

U.S. PATENT DOCUMENTS

| 4,925,468 A | 5/1990 | Kishi | |
|---|---|---|---|
| 2009/0320426 A1* | 12/2009 | Braunecker | B01D 46/12 55/511 |
| 2017/0120178 A1 | 5/2017 | Schacht | |

FOREIGN PATENT DOCUMENTS

| DE | 3834942 C2 | 7/1996 |
|---|---|---|
| DE | 102004005904 B4 | 7/2008 |

(Continued)

OTHER PUBLICATIONS

English language machine translation for DE 102020113615 A1. Retrieved from translationportal.epo.org on Mar. 13, 2024. (Year: 2024).*

*Primary Examiner* — Jason M Greene
(74) *Attorney, Agent, or Firm* — LEYDIG, VOIT & MAYER, LTD.

(57) ABSTRACT

The invention relates to a filter arrangement for cleaning an air stream having at least three filter elements, wherein each filter element has a bellows made of pleated filter medium, wherein the filter elements are arranged in series and any two adjacent filter elements are connected to one another by means of a connecting tab. According to the invention, a fold run-out of all end folds of all bellows is oriented in a particular direction, the connecting tabs are of two different embodiments and the different embodiments of the connecting tabs are arranged alternatingly when viewed in a longitudinal direction of the filter arrangement. Not only is a simple installation of the filter elements in a filter holder thus facilitated but also a defined seating of the filter elements in the filter holder is ensured.

8 Claims, 4 Drawing Sheets

(51) Int. Cl.
*B01D 46/24* (2006.01)
*B01D 46/40* (2006.01)
*B01D 46/42* (2006.01)
*B01D 46/62* (2022.01)

(52) U.S. Cl.
CPC ....... *B01D 46/2403* (2013.01); *B01D 46/406* (2013.01); *B01D 46/4236* (2013.01); *B01D 46/62* (2022.01)

(56) References Cited

FOREIGN PATENT DOCUMENTS

| | | | | |
|---|---|---|---|---|
| DE | 102020113615 A1 | * | 11/2020 | ............ B01D 46/52 |
| EP | 3162425 B1 | | 9/2017 | |
| JP | 2005007361 A | | 1/2005 | |

\* cited by examiner

FOLDABLE FILTER ARRANGEMENT CONSISTING OF A PLURALITY OF INDIVIDUAL FILTER ELEMENTS

CROSS-REFERENCE TO PRIOR APPLICATION

Priority is claimed to European Patent Application No. EP 20 212 692.6, filed on Dec. 9, 2020, the entire disclosure of which is hereby incorporated by reference herein.

FIELD

The embodiments of the present disclosure relate to a filter arrangement for cleaning an air stream, comprising at least three filter elements, wherein each filter element has a bellows made of pleated filter medium, wherein the filter elements are arranged in series and two adjacent filter elements are always connected to one another by means of a connecting tab.

BACKGROUND

A wide variety of filters for the filtration of air streams is known from the prior art, such as are used, for example, in air conditioning units, air cleaners, vacuum cleaners, etc. In order to achieve a larger effective filter surface, the filter medium is usually folded multiple times, in particular pleated.

Filters with pleated filter media are used in air filtration for vehicle cabins, as described, for example, in DE 10 2004 005 904 B4. Here the filter media may have different layers, for example electrically conductive and functional layers. A layer may also be provided with an electrostatic layer which increases the separation efficiency of the filter.

For good filtration performance, it is important that the entire air stream to be filtered is passed through the filter element and that there is no leakage. In other words, the filter element must be accommodated leakage-free in a filter housing or a filter holder. Installation space is often constricted and only small openings are available for inserting the filter elements into the filter holder.

If a filter arrangement consists of a plurality of filter elements, it must be ensured that no leakage occurs even between the filter elements. A further difficulty exists in installing the filter elements: on the one hand, they must be installed in a filter holder with correct alignment. On the other hand, the installation process must not be effortful and complicated and must be possible in a short period of time, if at all possible, without the use of tools.

To this end, DE 38 34 942 C2 proposes connecting individual filter elements to one another by a flexible tape. The tape between the individual filter elements is long enough for adjacent filter elements to be placed on top of each other. Due to the length of the tape and its attachment to the filter elements, a space can also be left between the filter elements in the installed state. This is disadvantageous since the air to be filtered is not then passed through the filter elements.

SUMMARY

In an embodiment, the present disclosure provides a filter arrangement for cleaning an air stream. The filter arrangement includes at least three filter elements, and each filter element of the at least three filter elements includes a bellows made of pleated filter medium. The at least three filter elements are arranged in series, a fold run-out of all end folds of the bellows is oriented in a particular direction, and connecting tabs connecting any two adjacent filter elements are of two different embodiments. The different embodiments of the connecting tabs are arranged alternatingly when viewed in a longitudinal direction of the filter arrangement.

The object is to create a filter arrangement for cleaning an air stream that comprises at least three filter elements, wherein the filter elements are connected to one another in such a way that simple installation of the filter elements in a filter holder is made possible and a defined seating of the filter elements in the filter holder is ensured.

BRIEF DESCRIPTION OF THE DRAWINGS

The present embodiments will be described in even greater detail below based on the exemplary figures. The embodiments are not limited to the exemplary embodiments. Other features and advantages of various embodiments of the present disclosure will become apparent by reading the following detailed description with reference to the attached drawings which illustrate the following.

DETAILED DESCRIPTION

Figure 1:
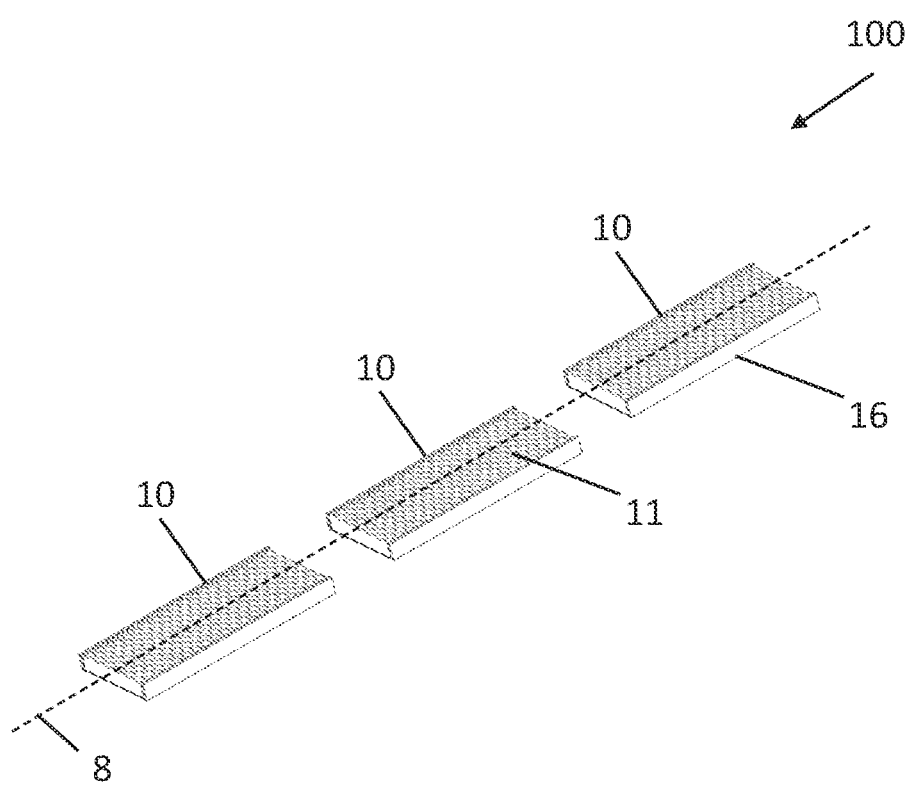
FIG. 1 illustrates a filter arrangement having three filter elements, in accordance with an embodiment.

According to the disclosure, it has been found advantageous to use connecting tabs of two different embodiments.

In an embodiment, the filter arrangement serving to clean an air stream, for example in the air-conditioning system of a motor vehicle, comprises at least three filter elements, wherein each filter element has a bellows made of pleated filter medium, wherein the filter elements are arranged in series and two adjacent filter elements are always connected to one another by means of a flexible, tape-like connecting tab in each case. In particular, a connecting tab is directly connected to the filter medium of two bellows in each case. In particular, one connecting tab is glued or thermally welded in each case to two filter elements.

A bellows can, in each case, be provided with an edging strip on its two opposite longitudinal sides.

The bellows of the filter elements are arranged in such a way that the fold run-out of all end folds, i.e., of the respectively outermost folds, is oriented in one direction, namely either toward the inflow side or toward the outflow side.

Advantageously, the connecting tabs of two differently shaped geometric designs (hinge type a, hinge type b) and the different embodiments of the connecting tabs are—viewed in the longitudinal direction of the filter arrangement—arranged alternatingly, i.e. alternately between two filter elements (F) in each case (i.e.: F a F b F . . . ).

The form and arrangement of the connecting tabs is such that the filter elements can in a folded-up state be placed on top of each other in a concertina-like manner and, in an unfolded state, abut against each other in their adjacent end folds. Not only is a simple installation of the filter elements in a filter holder thus facilitated but also a defined seating of the filter elements in the filter holder is ensured.

In a particularly advantageous and therefore preferred development of the filter arrangement—as viewed in the longitudinal section along the longitudinal axis of the unfolded filter arrangement—a first embodiment of the connecting tab comprises only an inverted, i.e. upside-down, V shape, that is to say a Λ shape, and a second embodiment of the connecting tab comprises only a U shape. On the legs of the Λ shape or the U shape, the latter can be connected in a planar manner to the end folds of the bellows.

If a bellows is provided with an edging strip on its two mutually opposite longitudinal sides, it may be advantageous for improving the installation and seating of the filter elements if the connecting tabs do not project beyond the edging strip at the inflow side or outflow side. For this purpose, the length of the connecting tabs must not exceed twice the height of the edging strip.

In a development of the filter arrangement, the connecting tabs may have a reduced cross-section at their intended fold edges in order to thus achieve a defined folding movement around the intended fold edge as a folding axis. This can be done, for example, by mechanical incision or stamping or by processing by means of a laser.

In the filter arrangement, the connecting tabs are preferably made of a filter material. This ensures that air passing through the connecting tabs is also filtered.

In a possible embodiment of the filter material, this is a so-called edging strip made of non-woven material. Alternative terms for "edging strip" are also "side tape", "side strip", or "edging band". The edging strip is a tape or strip made of a planar filter material having a certain inherent robustness.

In a possible embodiment of the filter material, this may have anti-allergenic and/or anti-viral properties. This is particularly preferred when the filter medium of the bellows also has anti-allergenic and/or anti-viral properties.

A particularly good filtration performance can be achieved if the filter medium has a multi-layer design, has at least one functional layer and has a preferred inflow direction so that the layers of the filter medium are flowed through in the "correct" order. The functional layer may have anti-allergenic, anti-fungicidal and/or anti-viral properties and may be implemented, for example, as described in EP3162425B1, to which reference is hereby made in its entirety.

Advantageously, in a filter arrangement having anti-allergenic and/or anti-viral properties of the filter medium and filter material, there are no regions with an air stream flowing through them which have no anti-allergenic and/or anti-viral properties and where allergens and/or viruses could pass through unfiltered.

The filter arrangement may have filter elements which in each case have a cuboid shape and in particular have a plank-like design, i.e., proportionally quite long, less wide, and not very high. Such a filter arrangement may be used, for example, in the vehicle cabins of buses, passenger trains and aircraft.

There will be a particular advantage in the production of the filter arrangement when all filter elements are identical in structure.

The described embodiments, even in combination with one another insofar as this is technically sensible, also constitute advantageous embodiments of the present disclosure.

EXEMPLARY EMBODIMENT

FIG. 1 shows an overview of a filter arrangement 100 having three filter elements 10, in accordance with an embodiment. The filter elements are arranged in series along the longitudinal axis 8 of the filter arrangement 100. Each filter element 10 has a bellows 11 and an edging strip 16 at the opposite longitudinal edges, said edging strip serving to seal and stabilize the bellows 11. In the illustration of FIG. 1, the filter elements 10 have been shown spaced apart from one another in order to show a state during the manufacturing process before the filter elements 10 are connected to one another by means of connecting tabs 1 (not shown).

Figure 2A:
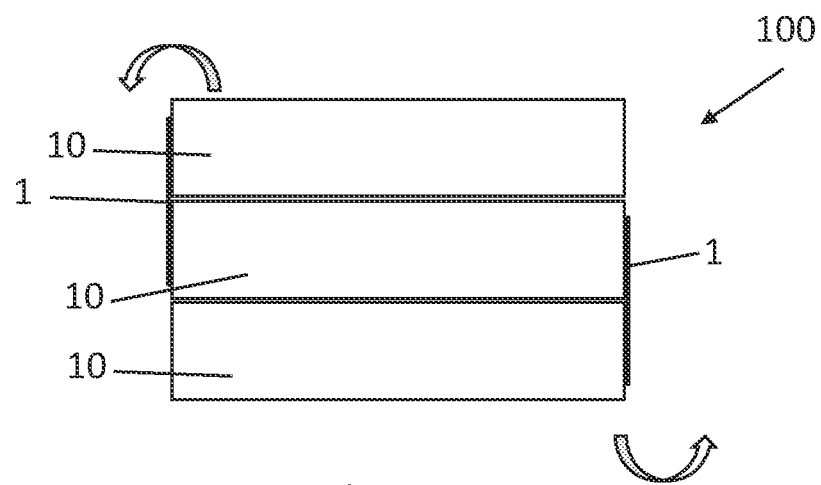
FIG. 2A illustrates a filter arrangement in a folded-up state, in accordance with an embodiment.
Figure 2B:
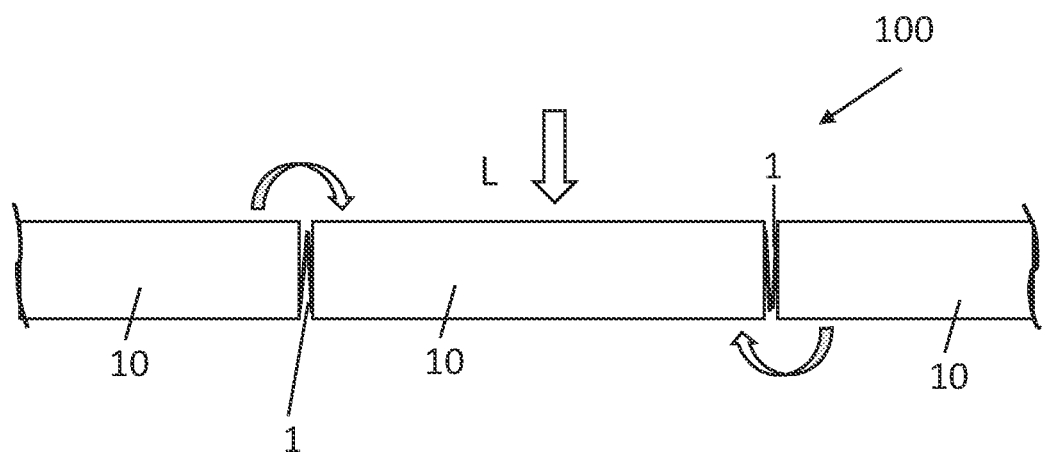
FIG. 2B illustrates a filter arrangement in an unfolded state, in accordance with an embodiment.
Figure 2C:
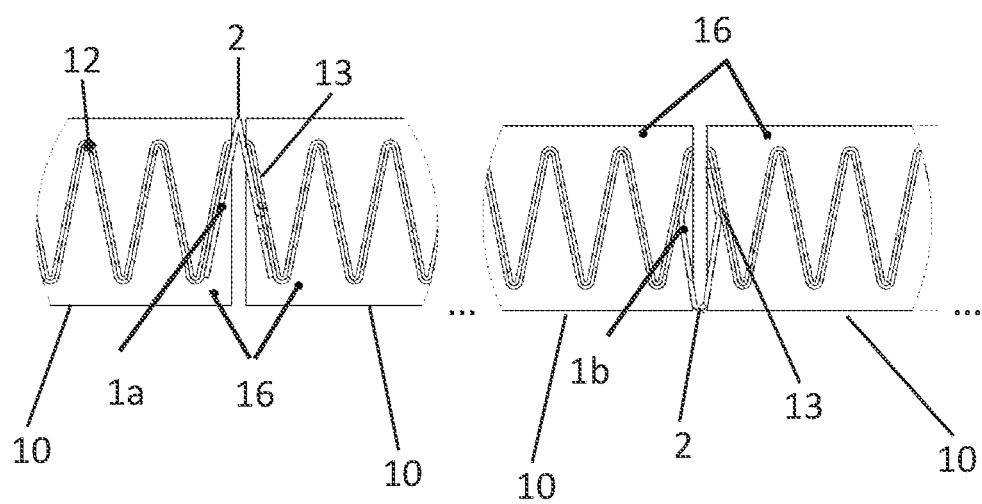
FIG. 2C is a detailed view of the connecting tabs between the filter elements, in accordance with an embodiment.

The connection of the filter elements 10 by means of connecting tabs 1 can be seen in FIGS. 2A-2C.

FIG. 2A shows a filter arrangement 100 in a folded-up state, in accordance with an embodiment. The filter elements 10 have been placed on top of each other in a concertina-like manner so that the filter arrangement 100 has only a limited space requirement, which is advantageous, for example, for storage and transportation. Two adjacent filter elements 10 are connected to one another by means of a connecting tab 1. The connecting tab may be glued or welded to the two filter elements 10.

On the left of the image the upper two filter elements 10 are connected to one another by means of the connecting tab 1 and on the right of the image the two lower filter elements 10 are connected to one another by means of the connecting tab 1. The uppermost filter element 10 is thus indirectly connected to the lowermost filter element 10 by means of the two connecting tabs 1 and the central filter element.

As indicated by the arrows, the filter arrangement 100 can be brought into an unfolded state by folding over the uppermost and lowermost filter elements 10.

FIG. 2B shows the filter arrangement of FIG. 2A in an unfolded state, in accordance with an embodiment. In this unfolded state, the filter arrangement 100 can be accommodated in a filter holder (not shown) and an air stream L can flow through it, wherein the air stream L is cleaned.

As indicated by the arrows, the filter arrangement can be brought into a folded-up state by folding over the outermost two filter elements 10.

While only three filter elements are shown in each case in FIGS. 1, 2A, and 2B, a larger number of filter elements 10 may also be provided and form a filter arrangement 100.

Two different embodiments of connecting tabs 1, namely a first hinge type 1a and a second hinge type 1b, are used between the filter elements 10. FIG. 2C shows a detailed view of the connecting tabs 1a, 1b between the filter elements 10 in a sectional view. The pleated filter medium 12 and the edging strips 16 can also be seen in section. The structure of the filter medium 12 is described in more detail with reference to FIG. 4.

Viewed in the longitudinal direction 8 of the filter arrangement 100, the connecting tabs 1 of a first hinge type 1a and of a second hinge type 1b are alternatingly arranged so that this kind of sequence results:

filter element 10-hinge type 1a-filter element 10-hinge type 1b-filter element 10—

When viewed in longitudinal section along the longitudinal axis 8 of the filter arrangement, the connecting tabs of the first hinge type 1a have an inverted, i.e. upside-down, V shape, that is to say a Λ shape.

When viewed in longitudinal section along the longitudinal axis 8 of the filter arrangement, the connecting tabs of the second hinge type 1b have a U shape.

On the legs of the Λ shape or the U shape, this is connected in a planar manner to the end folds 13 of the bellows 11 of the filter elements 10.

At their intended fold edges, the connecting tabs 1a, 1b have a reduced cross-section 2, which facilitates a defined folding over.

Figure 3:
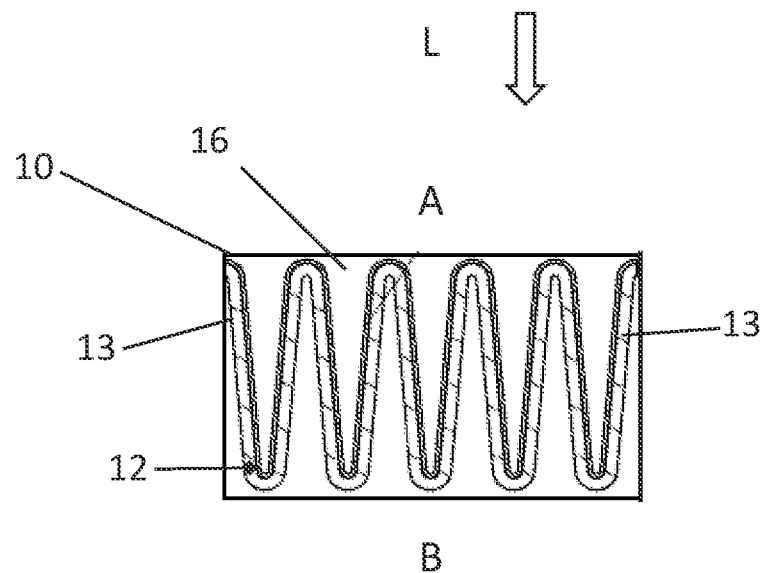
FIG. 3 is a sectional view of a filter element, in accordance with an embodiment.

The fold run-out of all end folds 13, that is to say of the outermost folds in each case, is oriented in one direction, namely preferably toward the inflow side A, as also seen in the sectional view of a filter element 10 in FIG. 3. The length of the connecting tabs 1 does not exceed twice the height of the edging strip 16 and the connecting tabs 1 do not project beyond the edging strips toward the inflow side A or outflow side B, which ensures a good installation and a good seating of the filter elements 10 of the filter arrangement 100 in a filter holder (not shown).

For improved clarity, the bellows 11 of the filter element 10 in FIG. 3 comprises a pleated filter medium 12 with only a small number of folds. The outermost folds are in each case referred to as end folds 13 and are oriented toward the inflow side A. An air stream L flows against the filter element 10 from the inflow side or raw gas side A and flows through the filter element 10 toward the outflow side or clean gas side B and is cleaned in the process.

Figure 4:
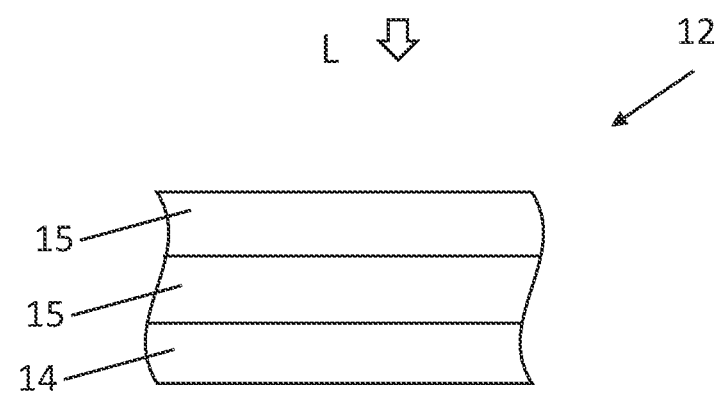
FIG. 4 is a sectional view of a filter medium, in accordance with an embodiment.

FIG. 4 is a sectional view of a filter medium 12, in accordance with an embodiment. The filter medium 12 has a multi-layer structure and has, in the example here, three layers, a first layer 15, a middle layer 15 and a final functional layer 14. The functional layer 14 may have anti-allergenic, anti-fungicidal and/or anti-viral properties. A preferred inflow direction L is provided so that the layers 14, 15 of the filter medium 12 are flowed through in the "correct" order.

While the embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the embodiments refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A filter arrangement for cleaning an air stream, the filter arrangement comprising at least three filter elements, wherein each filter element of the at least three filter elements includes a bellows made of pleated filter medium, wherein:
    the at least three filter elements are arranged in series,
    a fold run-out of all end folds of the bellows is oriented in a particular direction, and
    connecting tabs connecting any two adjacent filter elements are of two different embodiments and the different embodiments of the connecting tabs are arranged alternatingly when viewed in a longitudinal direction of the filter arrangement, wherein, when viewed in longitudinal section, a first embodiment of the connecting tabs has an inverted V shape and a second embodiment of the connecting tabs has a U shape.

2. The filter arrangement according to claim 1, wherein the connecting tabs have a reduced cross-section at their intended fold edges.

3. The filter arrangement according to claim 1, wherein the connecting tabs are made of a filter material.

4. The filter arrangement according to claim 3, wherein the filter material is an edging strip made of non-woven material.

5. The filter arrangement according to claim 3, wherein the filter material has anti-allergenic and/or anti-viral properties.

6. The filter arrangement according to claim 1, wherein the filter medium has a multi-layer design that includes at least one functional layer.

7. The filter arrangement according to claim 1, wherein each filter element of the at least three filter elements has a cuboid shape.

8. The filter arrangement according to claim 1, wherein all filter elements of the at least three filter elements are identical in structure.

* * * * *